(12) United States Patent
Sawada

(10) Patent No.: US 11,922,081 B2
(45) Date of Patent: Mar. 5, 2024

(54) INFORMATION PROCESSING APPARATUS, METHOD, AND PROGRAM PRODUCT COMPARING CURRENT AND REQUIRED DRIVER VERSION BASED ON PRINTER FIRMWARE UPDATE

(71) Applicant: CANON KABUSHIKI KAISHA, Tokyo (JP)

(72) Inventor: Hideharu Sawada, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/310,078

(22) Filed: May 1, 2023

(65) Prior Publication Data

US 2023/0359411 A1 Nov. 9, 2023

(30) Foreign Application Priority Data

May 9, 2022 (JP) ................................ 2022-077191

(51) Int. Cl.
*G06F 3/12* (2006.01)
*H04N 1/00* (2006.01)

(52) U.S. Cl.
CPC ............ *G06F 3/123* (2013.01); *G06F 3/1203* (2013.01); *G06F 3/1285* (2013.01); *H04N 1/00411* (2013.01)

(58) Field of Classification Search
CPC ...... G06F 3/123; G06F 3/1203; G06F 3/1285; H04N 1/00411; H04N 1/00962
See application file for complete search history.

(56) References Cited

U.S. PATENT DOCUMENTS

| | | | | |
|---|---|---|---|---|
| 8,804,172 B2* | 8/2014 | Ichikawa | ............... | G06F 3/1204 358/1.15 |
| 2013/0301069 A1* | 11/2013 | Yanagi | .................. | G06F 3/1285 358/1.13 |
| 2017/0329601 A1* | 11/2017 | Morita | .................. | G06F 9/4411 |
| 2021/0303223 A1* | 9/2021 | Fukumura | ................. | G06F 8/65 |
| 2023/0164281 A1* | 5/2023 | Yokoyama | ......... | H04N 1/00973 358/1.15 |

FOREIGN PATENT DOCUMENTS

| JP | 2006107251 A | * | 4/2006 |
|---|---|---|---|
| JP | 2011-186588 A | | 9/2011 |

* cited by examiner

*Primary Examiner* — Scott A Rogers
(74) *Attorney, Agent, or Firm* — VENABLE LLP

(57) ABSTRACT

An information processing apparatus gives an update notification of a firmware of the image printing apparatus and an update notification of a printer driver necessary for the information processing apparatus. The information processing apparatus having a driver that causes the image printing apparatus to execute image printing, includes: a driver information obtaining unit configured to obtain information on firmware update of the image printing apparatus and information on a required version of the driver; an information analysis unit configured to compare a current version of the driver and the information on the required version obtained by the driver information obtaining unit; and a display controlling unit configured to display an update notification screen based on a result analyzed by the information analysis unit and the information on the firmware update obtained by the driver information obtaining unit.

11 Claims, 18 Drawing Sheets

FIG.7A

| LATEST FIRMWARE VERSION | REQUIRED PRINTER DRIVER VERSION |
|---|---|
| 1.01 | 4.60 |

FIG.7B

| FIRMWARE UPDATE | REQUIRED PRINTER DRIVER VERSION |
|---|---|
| POSSIBLE | 4.60 |

FIG.7C

| FIRMWARE UPDATE | REQUIRED PRINTER DRIVER VERSION | OBTAINED TIME AND DATE |
|---|---|---|
| POSSIBLE | 4.60 | 2020/10/27 21:10:55 |

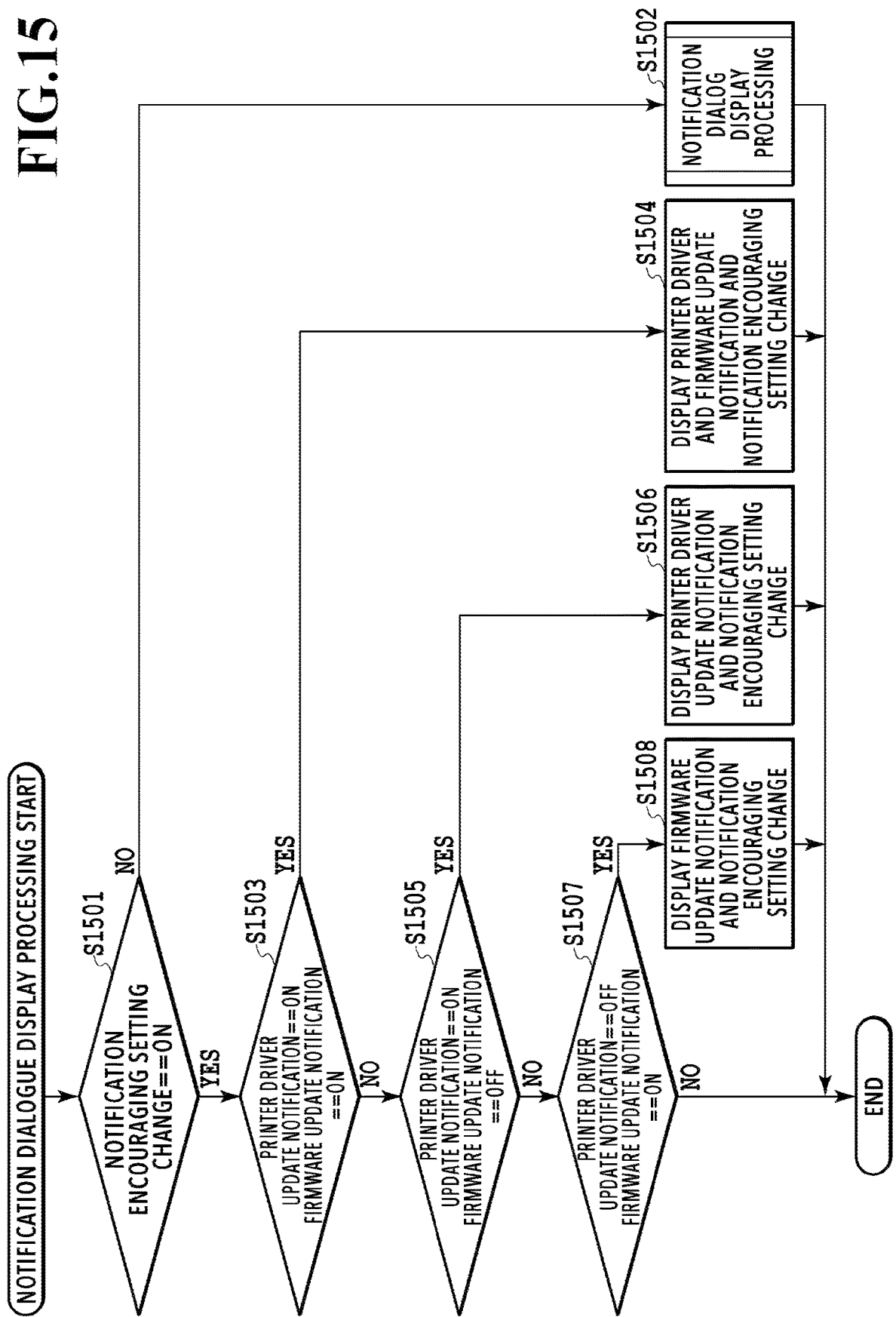

FIG.16A

| FIRMWARE VERSION | REQUIRED PRINTER DRIVER VERSION | CONTENTS |
|---|---|---|
| 1.01 | 4.60 | ADDITION OF TYPE OF PAPER: COATED PAPER A |

FIG.16B

| FIRMWARE UPDATE | REQUIRED PRINTER DRIVER VERSION | CONTENTS |
|---|---|---|
| POSSIBLE | 4.60 | ADDITION OF TYPE OF PAPER: COATED PAPER A |

FIG.16C

| FIRMWARE UPDATE | REQUIRED PRINTER DRIVER VERSION | CONTENTS | OBTAINING TIME AND DATE |
|---|---|---|---|
| POSSIBLE | 4.60 | ADDITION OF TYPE OF PAPER: COATED PAPER A | 2020/10/27 21:10:55 |

INFORMATION PROCESSING APPARATUS, METHOD, AND PROGRAM PRODUCT COMPARING CURRENT AND REQUIRED DRIVER VERSION BASED ON PRINTER FIRMWARE UPDATE

BACKGROUND

Field of the Disclosure

The present disclosure relates to an information processing apparatus that communicates with an image printing apparatus, an information processing method of the information processing apparatus, and a storage medium.

Description of the Related Art

In an electronic device such as a networkable printer, firmware for controlling hardware of this electronic device is saved in, for example, a flash memory that is a rewritable non-volatile memory. A provider of the firmware sometimes releases new firmware to add new functions to the electronic device or to fix bugs. In order use the new firmware in the electronic device, processing of updating the firmware saved in the flash memory of the electronic device to the new firmware, that is firmware update is necessary. A conventional printer has a function of obtaining information on the new firmware from a server connected via a network and downloading the new firmware from the server in the case where the new firmware is released (see, for example, Japanese Patent Laid-Open No. 2011-186588).

As means for executing printing with a printer, use of a printer driver installed in a host computer such as a personal computer (PC) connected to a printer has been conventionally popular. The printer driver includes print setting and means for changing the print setting. Moreover, the printer driver has a function of converting a document to be printed to print data interpretable by the printer according to the contents of the print setting and sending the print data out to the printer based on a print instruction from a user. The printer develops the received print data and generates a print product. Also for the printer driver, the provider sometimes releases a new printer driver to add new functions or to fix bugs, and update of the printer driver becomes necessary.

The update of the firmware and the update of the printer driver are preferably performed simultaneously in some cases depending on update contents of the firmware update and update contents of the printer driver update. For example, assume a case where supported types of paper are increased. In the case where only the firmware of the printer is updated and the printer driver is not updated, the user cannot give a print instruction from the printer driver while setting the type of paper to an added type of paper. However, the user cannot recognize presence of update of the printer driver corresponding to the firmware of the printer, simultaneously with the update of the firmware, and this has been conventionally a problem.

SUMMARY

An embodiment of the present disclosure for solving the above problem is a non-transitory computer readable storage medium storing a program for causing a computer to perform functions as an information processing apparatus having a driver that causes an image printing apparatus to execute image printing, the functions including: a driver information obtaining step for obtaining information on firmware update of the image printing apparatus and information on a required version of the driver; an information analysis step for comparing a current version of the driver and the information on the required version obtained by the driver information obtaining step; and a display controlling step for displaying an update notification screen based on a result analyzed by the information analysis step and the information on the firmware update obtained by the driver information obtaining step.

Further features of the present invention will become apparent from the following description of exemplary embodiments with reference to the attached drawings.

BRIEF DESCRIPTION OF THE DRAWINGS

FIGS. 7A to 7C are diagrams illustrating information retained in the print system in the first embodiment;

FIG. 15 is a flowchart illustrating processing of a notification dialogue display unit in the third embodiment;

FIGS. 16A to 16C are diagrams illustrating information retained in the print system in the third embodiment;

DESCRIPTION OF THE EMBODIMENTS

Figure 1:
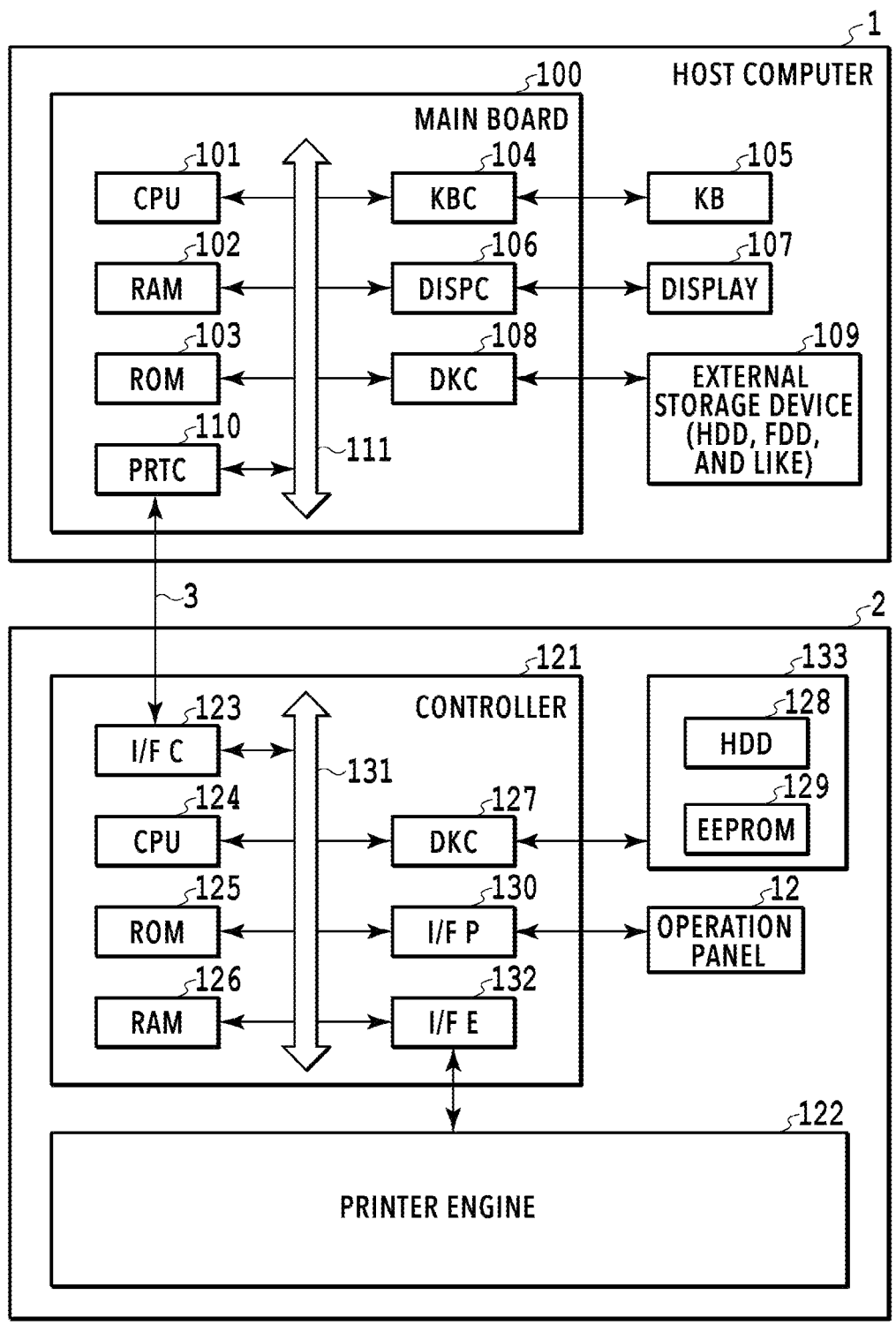
FIG. 1 is a diagram illustrating a configuration of a print system in the present embodiments.

Embodiments of the present disclosure are described below in detail with reference to the drawings. The following embodiments do not limit the contents of the invention described in the scope of claims, and not all of combinations of features described in the present embodiments are necessarily essential for solving means of the present disclosure. Note that the same component elements are denoted by the same reference numerals, and description thereof is omitted.

FIG. 1 illustrates a configuration of a print system in the present embodiments. The print system includes a host computer (hereinafter, host) 1 such as a PC as an information processing apparatus and a printer 2 such as an inkjet printer as an image printing apparatus. The host 1 and the printer 2 are connected to each other via a predetermined bidirectional interface (for example, USB, TCP/IP, and the like) 3.

The host 1 includes a main board 100 including a CPU 101 and the like, a keyboard (KB) 105, a display (DISPLAY) 107 such as an LCD, and an external storage device 109 such as a hard disk (HDD) and a flexible disk (FDD). The main board 100 includes a RAM 102, a ROM 103, a keyboard controller (KBC) 104, a display controller (DISPC) 106, a disk controller (DKC) 108, and a printer controller (PRTC) 110.

The CPU 101 integrally controls the aforementioned various component elements connected to a system bus 111 and executes various programs. The RAM 102 functions as a main memory or a work area of the CPU 101. The ROM 103 stores an operating system, a program that executes functions including a print driver according to the present embodiments, a boot program, various applications, a printer control command generation program (hereinafter, printer driver), and the like.

The keyboard controller (KBC) 104 controls user inputs from an input device such as the keyboard 105 and a pointing device (not illustrated). The keyboard controller 104 is referred also to as an operation unit and an input unit. The display controller (DISPC) 106 performs display control of the display 107. The disk controller (DKC) 108 controls an access to the external storage device 109 such as the HDD and the FDD. The printer controller (PRTC) 110 is connected to the printer 2 via the bidirectional interface 3, and controls communication processing of data and commands with the printer 2.

The printer 2 includes a controller 121, a printer engine 122, an operation panel 12, and a non-volatile storage device 133, and is connected to the host 1 via the bidirectional interface 3. The controller 121 includes a CPU 124, a ROM 125, a RAM 126, an interface controller (I/FC) 123, a disk controller (DKC) 127, and a panel interface (I/FP) 130. Moreover, the controller 121 includes an engine interface (I/FE) 132 connected to the printer engine 122. The CPU 124 integrally controls the aforementioned component elements connected to a system bus 131, and executes various programs. The ROM 125 stores programs and various pieces of data that implement optimal image printing by receiving print image data and commands from the host 1 and controlling the printer engine 122. The RAM 126 is used as a work area configured to temporarily store various pieces of data and various programs. The interface controller (I/FC) 123 is connected to the host 1 via the bidirectional interface 3, and controls communication processing of data and commands with the host 1.

The disk controller (DKC) 127 controls an access to the non-volatile storage device 133. The non-volatile storage device 133 includes a hard disk (HDD) 128 and an EEPROM 129. The non-volatile storage device is sometimes also referred to as non-volatile memory. The hard disk (HDD) 128 stores large-volume data such as data from the host 1 and attached information relating to this data. The EEPROM 129 stores information such as information unique to the image printing apparatus used in the case where image printing is executed.

The panel interface (I/FP) 130 controls display on the operation panel 12 and an input from the operation panel 12. The engine interface (I/FE) 132 controls the printer engine 122 that directly controls hardware and implements optimal image printing. Note that, although a printer engine using an inkjet printing method is used as the printer engine 122 in the present embodiment, the printer engine 122 may use other image printing methods such as a printer engine according to an electrophotographic method or an offset printing machine.

Figure 2:
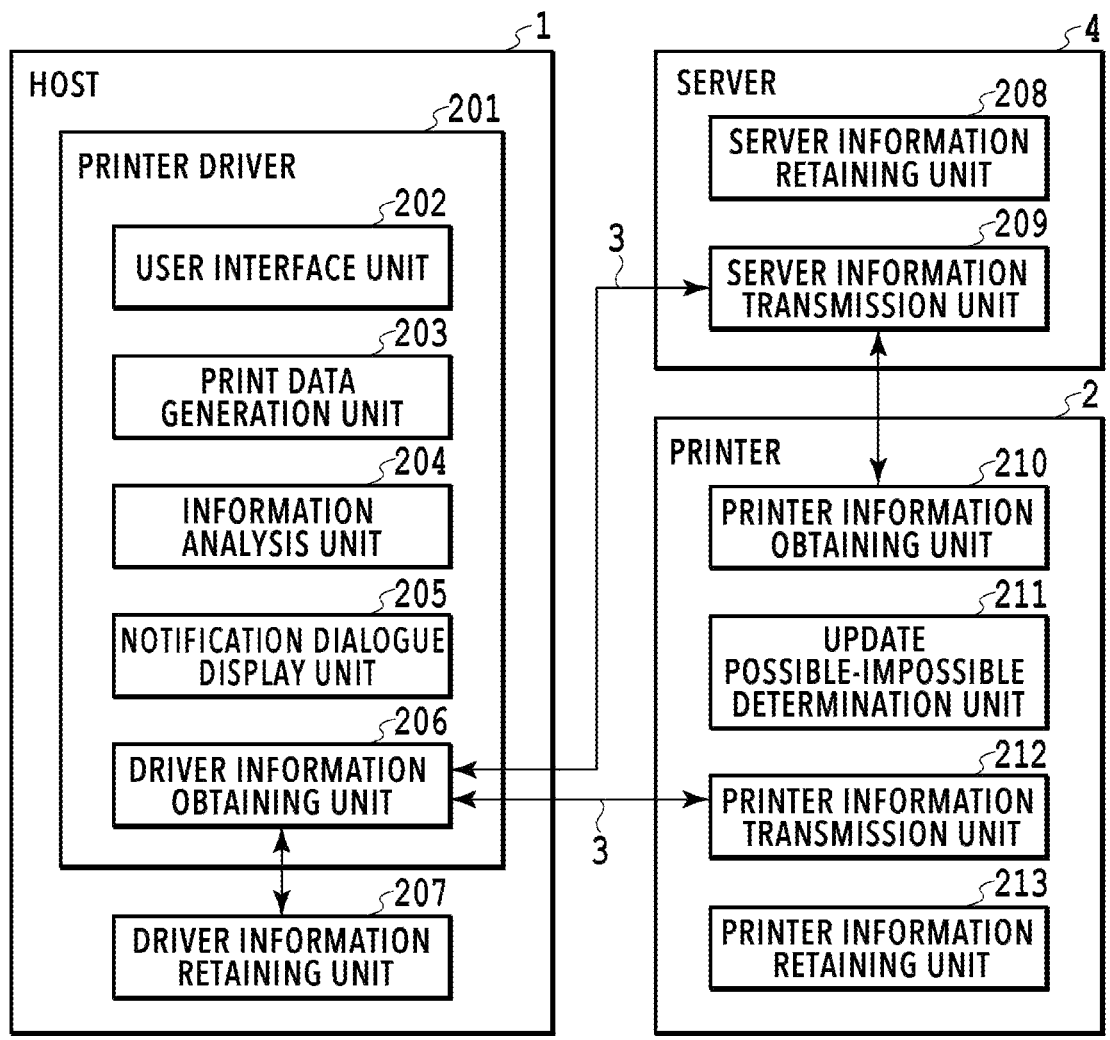
FIG. 2 is a block diagram illustrating a functional configuration in the print system of the present embodiments.

FIG. 2 illustrates a functional configuration in the print system of the present embodiment. The host 1 includes a printer driver 201 that is dedicated software for generating control commands and a print job that are used to cause the printer 2 to execute image printing. The printer driver 201 includes function units and information retaining units described below.

A user interface unit 202 is a function unit that provides means for inputting print setting of the printer driver 201 to a user. The printer driver 201 displays a print setting screen on the display 107 based on a display command of the print setting screen from the operating system. The user interface unit 202 internally retains information on functions of the printer 2, and displays the print setting screen based on this information.

A print data generation unit 203 is a function unit that generates print data to be sent out to the printer 2 as the print job. The print data generation unit 203 converts a document prepared by the user to a data format interpretable by the printer 2, according to the print setting set by using the user interface unit 202. Moreover, the print data generation unit 203 generates a control command for performing control of the printer 2.

An information analysis unit 204 analyzes information obtained in a driver information obtaining unit 206. Details of analysis processing are described later. A notification dialogue display unit 205 displays a notification dialogue based on an analysis result of the information analysis unit 204. Details of notification dialogue display processing are described later. The driver information obtaining unit 206 can obtain information from a printer information transmission unit 212 of the printer 2 via the bidirectional interface 3. Moreover, the driver information obtaining unit 206 can obtain information from a server information transmission unit 209 of a server 4 via the bidirectional interface 3 as necessary. The driver information obtaining unit 206 can retain the obtained information in a driver information retaining unit 207.

Although the information analysis unit 204, the notification dialogue display unit 205, and the driver information obtaining unit 206 are part of the configuration of the printer driver 201 in this example, these units may be provided as separate applications installed in the host 1. Moreover, although the driver information retaining unit 207 is part of the configuration of the host 1, the driver information retaining unit 207 only needs to be at a location where the driver information obtaining unit 206 can access, and may be on the server 4 or the printer 2.

The server 4 includes a server information retaining unit 208 and the server information transmission unit 209. The server information retaining unit 208 retains information on the latest firmware update and information on required version of the printer driver. Moreover, the server information retaining unit 208 may retain the latest firmware itself and the printer driver itself. Furthermore, the information retained in the server information retaining unit 208 can be freely updated by a provider of the firmware and a provider of the printer driver, and the update can be performed at timings at which the latest firmware and the printer driver are prepared. The server information transmission unit 209 transmits the information retained by the server information retaining unit 208, in response to a request of a printer information obtaining unit 210 in the printer 2.

The printer 2 includes the printer information obtaining unit 210, an update possible-impossible determination unit 211, the printer information transmission unit 212, and a printer information retaining unit 213. The printer information obtaining unit 210 can retain the information obtained from the server 4 in the printer information retaining unit 213. The update possible-impossible determination unit 211 determines whether update of the firmware is possible, based on the information obtained in the printer information obtaining unit 210 and the state of the printer 2. For example, in the case where the printer 2 is in an idle state and firmware that is newer than the current firmware is prepared, the update possible-impossible determination unit 211 determines that update of the firmware is possible. Information determined in the update possible-impossible determination unit 211 can be also retained in the printer information retaining unit 213. The printer information transmission unit 212 transmits the information retained in the printer information retaining unit 213, in response to the information obtaining request of the driver information obtaining unit 206 in the printer driver 201.

First Embodiment

Figure 3:
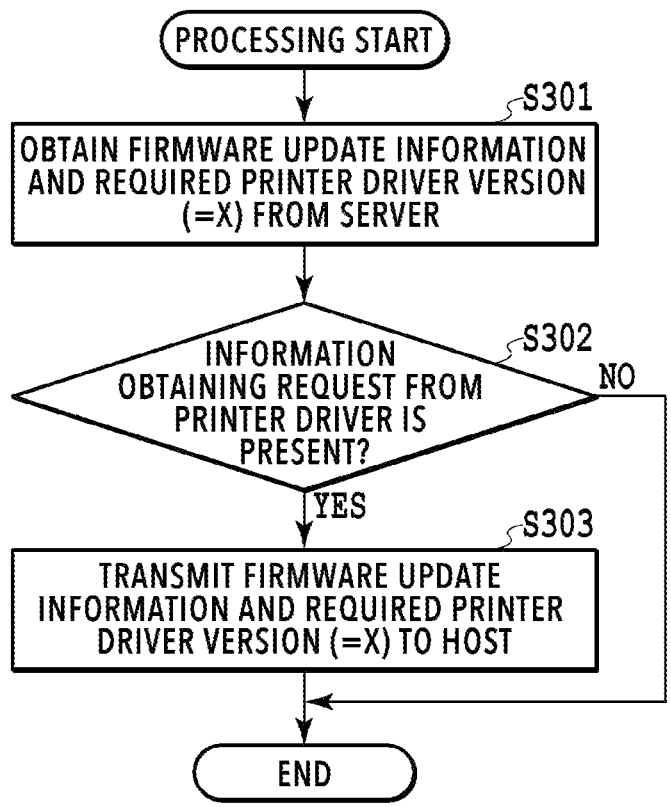
FIG. 3 is a flowchart illustrating information processing of a printer in a first embodiment.

FIG. 3 illustrates information processing of the printer in a first embodiment. This information processing is executed at activation of the printer 2 and at predetermined intervals while the printer 2 is active. In step S301, the printer 2 obtains firmware update information and a required printer driver version (=X) from the server 4. Specifically, the printer 2 obtains the information retained by the server information retaining unit 208 of the server 4 via the server information transmission unit 209, in response to a request from the printer information obtaining unit 210 of the printer 2. The printer 2 retains the obtained information in the printer information retaining unit 213.

In step S302, in the case where there is the information obtaining request from the driver information obtaining unit 206 of the printer driver 201, the printer 2 proceeds to step S303. In step S303, the printer 2 transmits the firmware update information and the required printer driver version (=X) obtained in step S302 to the printer driver 201, and terminates the processing. Specifically, the printer 2 transmits the information retained in the printer information retaining unit 213 to the driver information obtaining unit 206 via the printer information transmission unit 212.

In step S302, in the case where there is no information obtaining request from the driver information obtaining unit 206, the printer 2 terminates the processing of the present flowchart without performing any operation. Performing this information processing allows the firmware update information and the required printer driver version (=X) to be transmitted to the driver information obtaining unit 206 of the printer driver 201.

Figure 4:
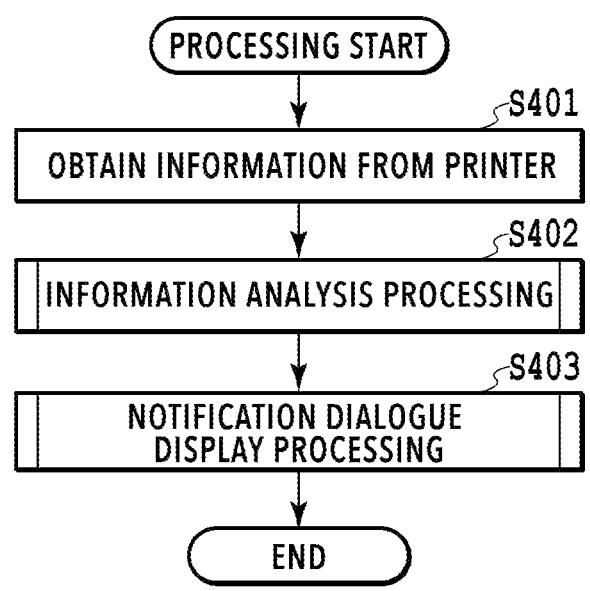
FIG. 4 is a flowchart illustrating processing of a status monitor in the first embodiment.

FIG. 4 illustrates processing of a status monitor in the first embodiment. The status monitor is a component of the printer driver 201. The status monitor can be activated in the case where a print operation is performed in the host 1, and obtain the state of the printer 2 to display information on the printer 2 such as a status of printing and a remaining amount of ink on the display 107. Moreover, the status monitor can be resident in the host 1 and be activated by polling instead of the print operation, and obtain the information on the printer 2 at predetermined intervals. Note that, although the status monitor is part of the configuration of the printer driver 201 in the present embodiment, the status monitor may be provided as a separate application installed in the host 1.

In step S401, the status monitor obtains the firmware update information and the required printer driver version (=X) from the printer 2. Next, proceeding to step S402, the status monitor performs analysis processing of the information obtained in step S401. Details of step S402 are described later.

The status monitor further proceeds to step S403 to perform display processing of a notification dialogue, and terminates the processing of the present flowchart. Details of step S403 are described later. Performing the processing of the status monitor allows an appropriate update notification dialogue to be displayed based the information obtained from the printer 2.

Figure 5:
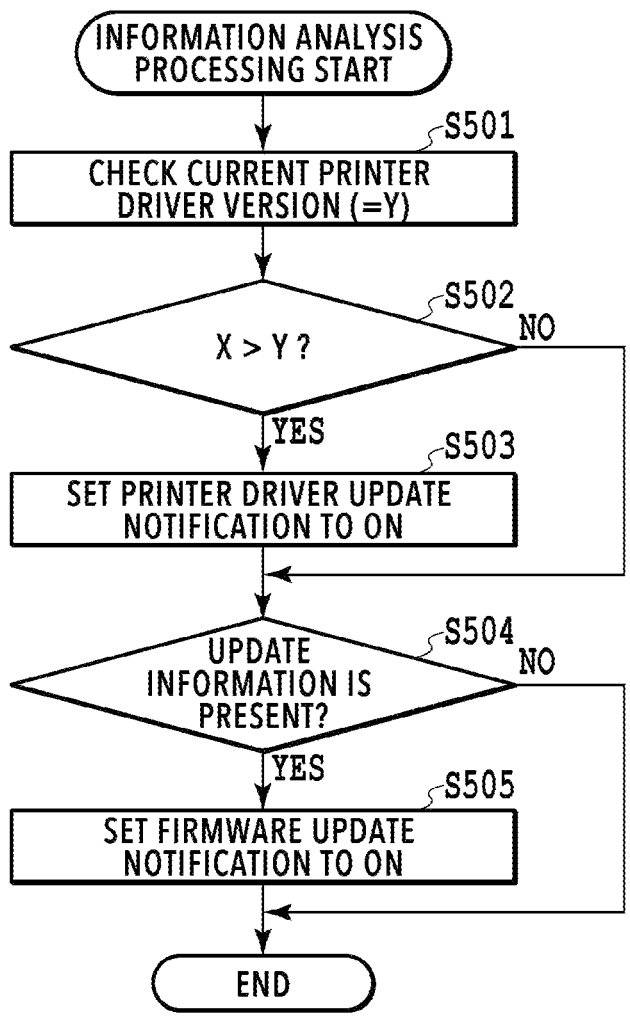
FIG. 5 is a flowchart illustrating processing of an information analysis unit in the first embodiment.

FIG. 5 illustrates processing of the information analysis unit in the first embodiment. This processing is the analysis processing of the information that is executed by the information analysis unit 204 of the printer driver 201 and that is illustrated in step S402 of FIG. 4. In step S501, the information analysis unit 204 checks the current printer driver version (=Y). Next, in step S502, the information analysis unit 204 compares the required printer driver version (=X) obtained in step S401 of FIG. 4 and the current printer driver version (=Y) checked in step S501.

In this case, the version of the printer driver is expressed by a numerical value with multiple digits and the larger the absolute value is, the newer the version is. In the case where the current printer driver version (=Y) is smaller than the required printer driver version (=X) (X>Y), the information analysis unit 204 proceeds to step S503. In step S503, the information analysis unit 204 sets a printer driver update notification to ON, and proceeds to step S504. Meanwhile, in the case where the current printer driver version (=Y) is larger than the required printer driver version (=X) (X<Y) in step S502, the information analysis unit 204 proceeds to step S504 without performing any operation. Specifically, in the case where the current printer driver is newer than the required printer driver, the information analysis unit 204 proceeds to step S504 without performing any operation. Note that, although the version of the printer driver is expressed by a numerical value with multiple digits in this example, the version of the printer driver may be expressed by a one-digit numerical value or a form other than a numerical value as long as comparison of new and old versions is possible.

In step S504, in the case where update information is present in the firmware update information obtained in step S401 of FIG. 4, the information analysis unit 204 proceeds to step S505. In step S505, the information analysis unit sets a firmware update notification to ON, and terminates the processing. Meanwhile, in the case where there is no update information, the information analysis unit 204 terminates the processing without performing any operation. Performing the processing of the information analysis unit 204 enables analysis of the information obtained from the printer 2 to determine whether the update notification of the printer driver is necessary or not and to determine whether the update notification of the firmware is necessary or not.

Figure 6:
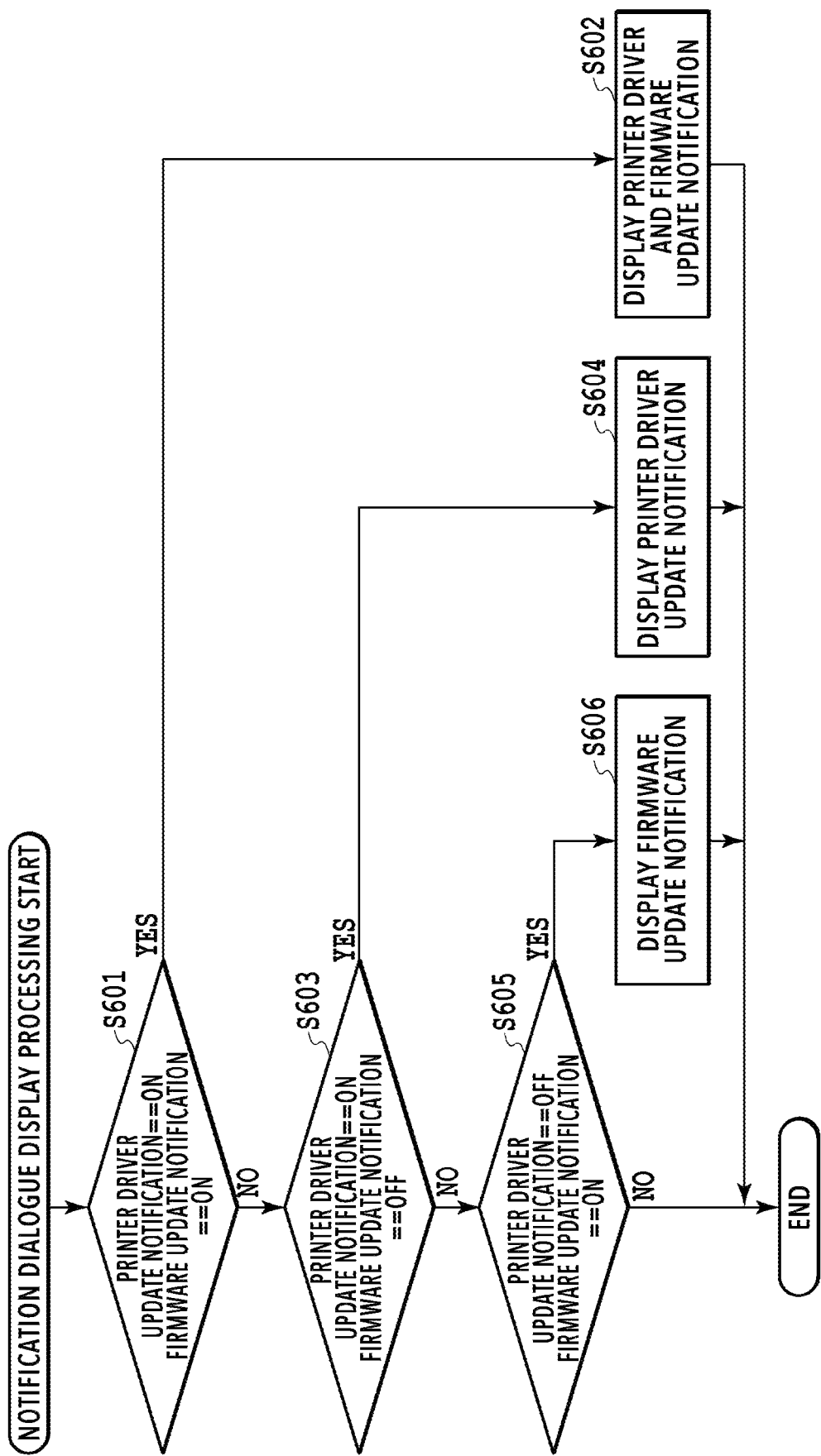
FIG. 6 is a flowchart illustrating processing of a notification dialogue display unit in the first embodiment.

FIG. 6 illustrates processing of the notification dialogue display unit in the first embodiment. This processing is display processing of a notification dialogue that is executed by the notification dialogue display unit 205 of the printer driver 201 and that is illustrated in step S403 of FIG. 4. In the case where, in step S601, the printer driver update notification and the firmware update notification are both ON as a result of the analysis processing of the information in step S402 of FIG. 4, the notification dialogue display unit 205 proceeds to step S602. In step S602, the notification dialogue display unit 205 displays a printer driver and firmware update notification dialogue, and terminates the processing.

In the case where not both of the printer driver update notification and the firmware update notification are ON, the notification dialogue display unit 205 proceeds to processing of step S603. In the case where, in step S603, the printer driver update notification is ON and the firmware update notification is OFF, the notification dialogue display unit 205 proceeds to processing of step S604 to display a printer driver update notification dialogue, and terminates the processing.

In the case where the notifications are not in the state where the printer driver update notification is ON and the firmware update notification is OFF, the notification dialogue display unit 205 proceeds to processing of step S605. In the case where, in step S605, the printer driver update notification is OFF and the firmware update notification is ON, the notification dialogue display unit 205 proceeds to processing of step S606 to display a firmware update notification dialogue, and terminates the processing.

The case where the notification dialogue display unit 205 proceeds to the processing of step S606 is the case where the version of the printer driver is the latest version and the firmware of the printer 2 needs to be updated. For example, assume a case where contents of update in the print system is contents of adding a coated paper A to the types of paper. In the case where the coated paper A that is the latest function is selected in the host 1 and the printing is executed, the printer driver 201 transmits print setting in which the coated paper A is selected, to the printer 2. However, since the update of the firmware is not performed, the printer 2 may not be able to normally print the print data in which the coated paper A is set. Accordingly, in the processing of the status monitor, it is possible to display the firmware update notification dialogue and to also stop the printing and force the update of the firmware.

In the case where the notifications are not in the state where the printer driver update notification is OFF and the firmware update notification is ON, specifically, in the case where neither the printer driver nor the firmware needs to be updated, the notification dialogue display unit 205 terminates the processing without performing any operation. Performing the processing of the notification dialogue display unit 205 allows the necessary notification dialogues such as the update notifications of the printer driver and the firmware to be displayed based on the result of the information analysis processing.

FIGS. 7A to 7C illustrate information retained in the print system in the first embodiment. FIG. 7A is information retained by the server information retaining unit 208 of the server 4. The latest firmware version 1.01 is illustrated as the firmware update information. Moreover, as the required printer driver version, FIG. 7A illustrates that the required version of the printer driver necessary for the operation of the latest firmware is 4.60 or above.

FIG. 7B is information retained by the printer information retaining unit 213 of the printer 2. FIG. 7B illustrates that the firmware is in the state where the update thereof is possible and that the required printer driver version for operating the latest firmware is 4.60 or above.

FIG. 7C is information retained by the driver information retaining unit 207 of the printer driver 201. This information retains the fact that the firmware is in the state where the update thereof is possible, the fact that the required printer driver version for operating the latest firmware is 4.60 or above, and the time and date at which these pieces of information is obtained.

Figure 8A:
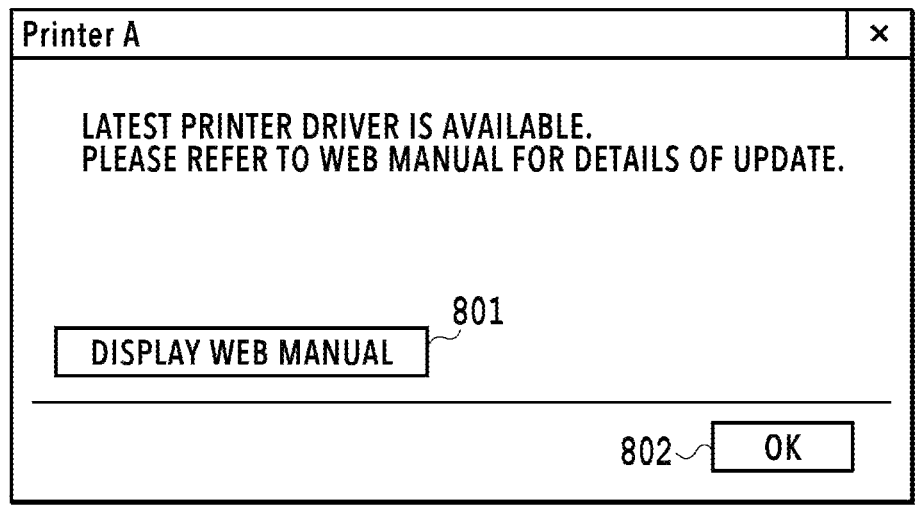
FIGS. 8A to 8C are diagrams illustrating update notification screens displayed by the notification dialogue display unit in the first embodiment.
Figure 8B:
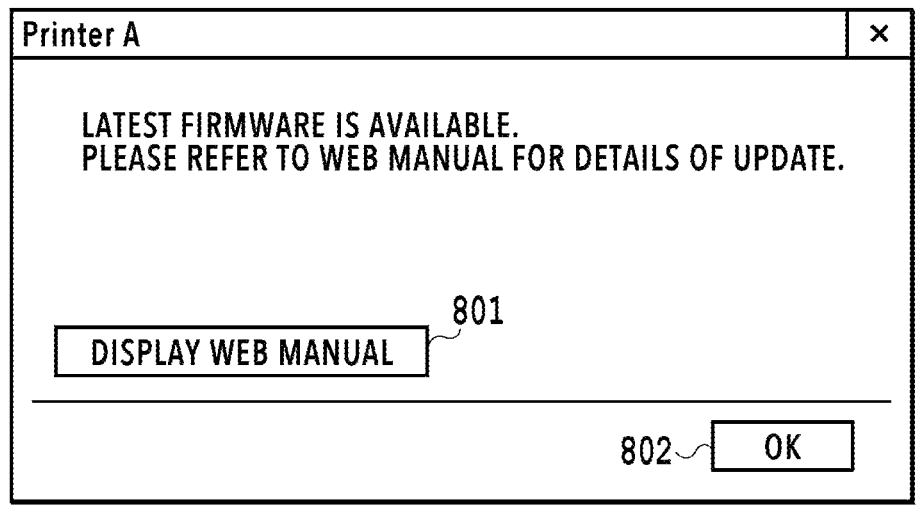
Figure 8C:
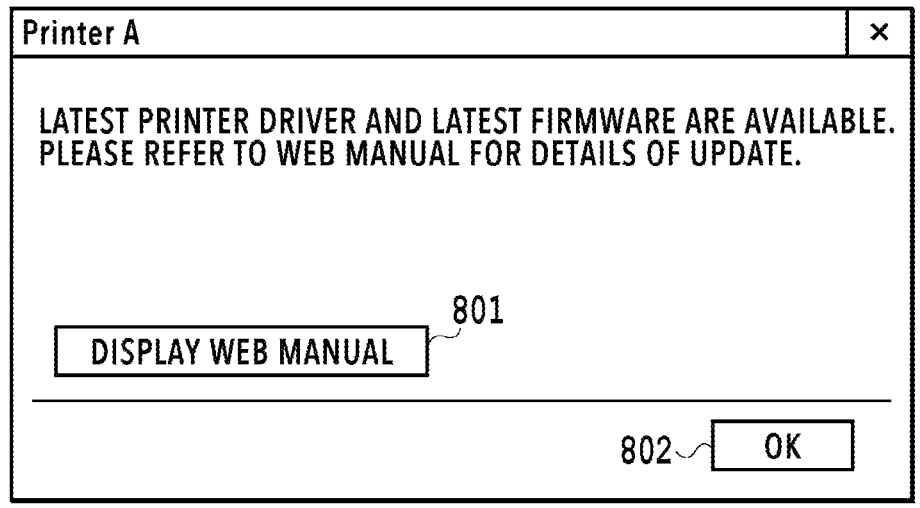

FIGS. 8A to 8C illustrate the update notification screens displayed by the notification dialogue display unit in the first embodiment. FIG. 8A is the printer driver update notification dialogue displayed in the processing of step S604 illustrated in FIG. 6, and can be displayed on the display 107 of the host 1 by the notification dialogue display unit 205 of the printer driver 201. In this notification dialogue, a manual display button 801 and an OK button 802 are displayed in addition to a message encouraging update to the latest printer driver. In the case where the web manual display button 801 is pressed, the display jumps to a web page in which a method of updating the printer driver and the firmware and contents of the update are described. In the case where the OK button 802 is pressed, this notification dialogue is closed.

FIG. 8B is the firmware update notification dialogue displayed in the processing of step S606 illustrated in FIG. 6, and a message encouraging update to the latest firmware is displayed. FIG. 8C is the printer driver and the firmware update notification dialogue displayed in the processing of step S602 illustrated in FIG. 6, and a message encouraging update to the latest printer driver and firmware is displayed.

As described above, according to the first embodiment, it is possible to perform the update notification of the firmware of the image printing apparatus and the update notification of the printer driver necessary for the information processing apparatus.

Second Embodiment

Also in a second embodiment, the information processing of the printer 2 is the same as that in the flowchart illustrated in FIG. 3. In the processing of the status monitor, two types of processing to be described below are both used and performed to allow the print system to surely notify the user of latest information on the firmware and the printer driver.

Figure 9:
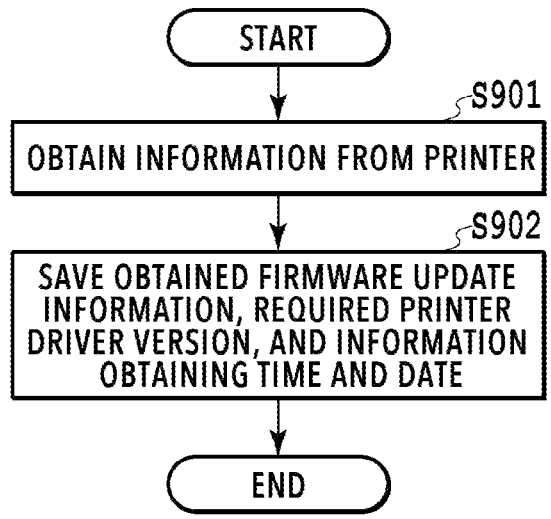
FIG. 9 is a flowchart illustrating first processing of the status monitor in a second embodiment.

FIG. 9 illustrates first processing of the status monitor in the second embodiment. The first processing of the status monitor may be activated in the case where a print operation is performed in the host 1, or may be resident in the host 1 and be regularly activated by polling. In the second embodiment, description is given of the case where the first processing is activated by polling. Note that, although the status monitor is part of the configuration of the printer driver 201 in the second embodiment, the status monitor may be provided as a separate application installed in the host 1.

In step S901, the status monitor obtains the firmware update information and the required printer driver version (=X) from the printer 2. Next, proceeding to step S902, the status monitor saves the information obtained in step S901 and the time and date at which this information is obtained together in the driver information retaining unit 207, and terminates the processing. Performing the first processing of the status monitor allows the host 1 to retain the information obtained from the printer 2 and to perform the display processing of the notification dialogue by using the retained information even if there is a situation where the host 1 cannot obtain the information from the printer 2 after the retaining.

Figure 10:
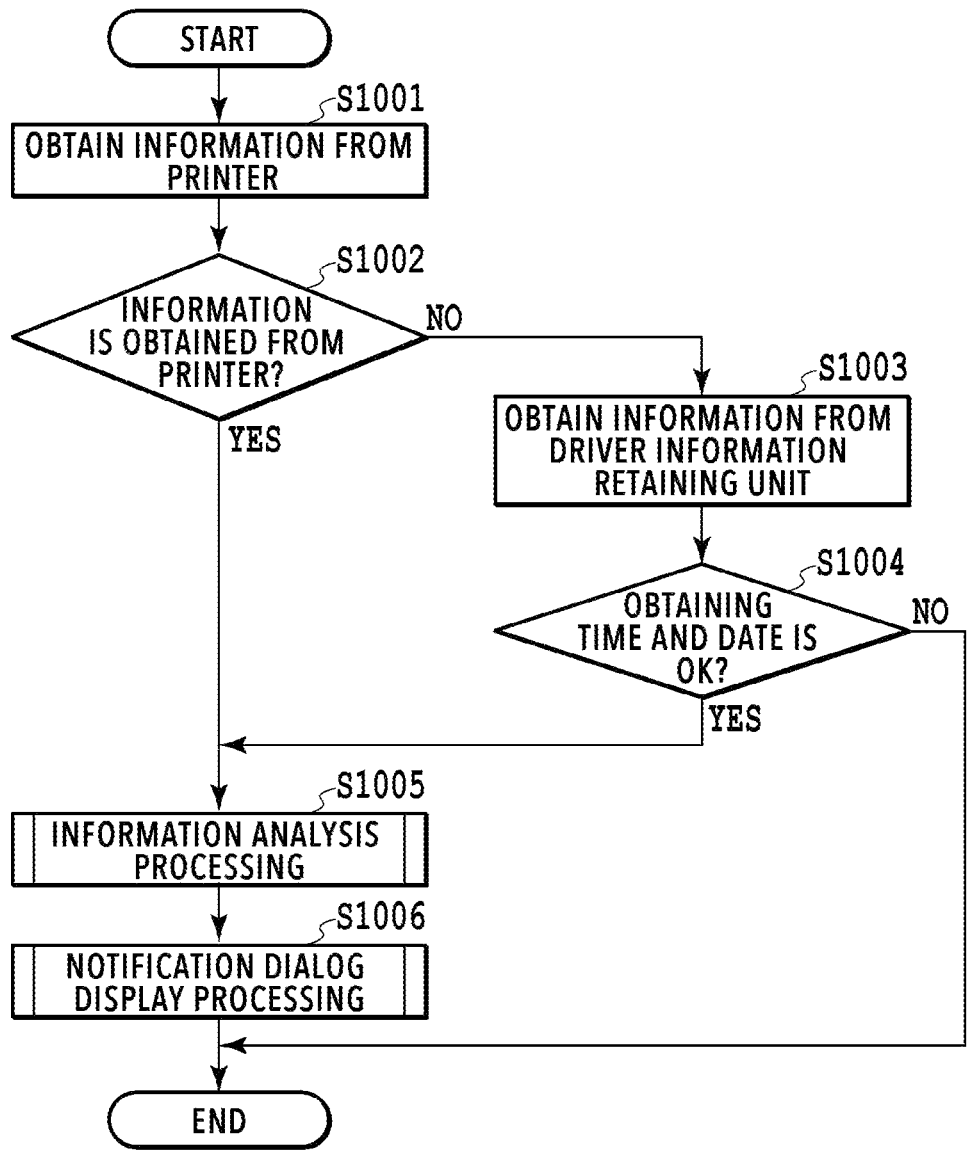
FIG. 10 is a flowchart illustrating second processing of the status monitor in the second embodiment.

FIG. 10 illustrates the second processing of the status monitor in the second embodiment. The second processing of the status monitor is activated in the case where the user performs desired print setting on the printer driver 201 and closes a user interface, that is after determination of the print setting.

In step S1001, the status monitor obtains the firmware update information and the required printer driver version (=X) from the printer 2. Next, proceeding to step S1002, the status monitor checks whether the information is obtained from the printer 2. In the case where the information is not obtained, the status monitor proceeds to step S1003. Meanwhile, in the case where the information is obtained from the printer 2, the status monitor proceeds to processing of step S1005.

In step S1003, the status monitor obtains the information retained in the driver information retaining unit 207 in step S902 of FIG. 9, that is the information obtained in the first processing of the status monitor. Next, proceeding to step S1004, the status monitor refers to the information on the obtained time and date in the information obtained in step S1003, and determines whether this information is valid or not. In this case, the status monitor compares the obtained time and date with the current time and date. The status monitor determines that the information is valid if a period from the obtained time and date to the current time and date is less than one month, and determines that the information is invalid if the period from the obtained time and date to the current time and date is equal to or more than one month. In the case where the information is valid, the status monitor proceeds to processing of step S1005. In the case where the information is invalid, the status monitor terminates the processing without performing any operation. Although the predetermined period for determining the validity is set to one month in the second embodiment, the unit or length of the period may be set to any unit or length. Accordingly, the status monitor determines whether the predetermined period has elapsed from the obtained time and date to the current time and date and, if the predetermined period has elapsed, determines that the information is invalid and, if the predetermined period has not elapsed, determines that the information is valid.

In step S1005, the status monitor performs analysis processing of the obtained information. Since the analysis processing of the information is the same as the analysis processing of the information illustrated in FIG. 5, description thereof is omitted herein. Next, proceeding to step S1006, the status monitor executes display processing of a notification dialogue, and terminates the processing. Since the display processing of a notification dialogue is the same as the processing illustrated in FIG. 6, description thereof is omitted herein.

In the processing of the status monitor in the second embodiment, since the update notification of the firmware and the printer driver is made to the user after the determination of the print setting, the notification can be made to the user well in advance compared to the case where the notification is made at the time of execution of printing. Moreover, even if there is a situation where the host 1 cannot obtain the information from the printer 2 after the determination of the print setting, the host 1 can surely make the notification to the user by obtaining the information retained in advance. Furthermore, checking the time and date of the information retained in advance can prevent erroneous usage of old information.

Third Embodiment

Figure 11:
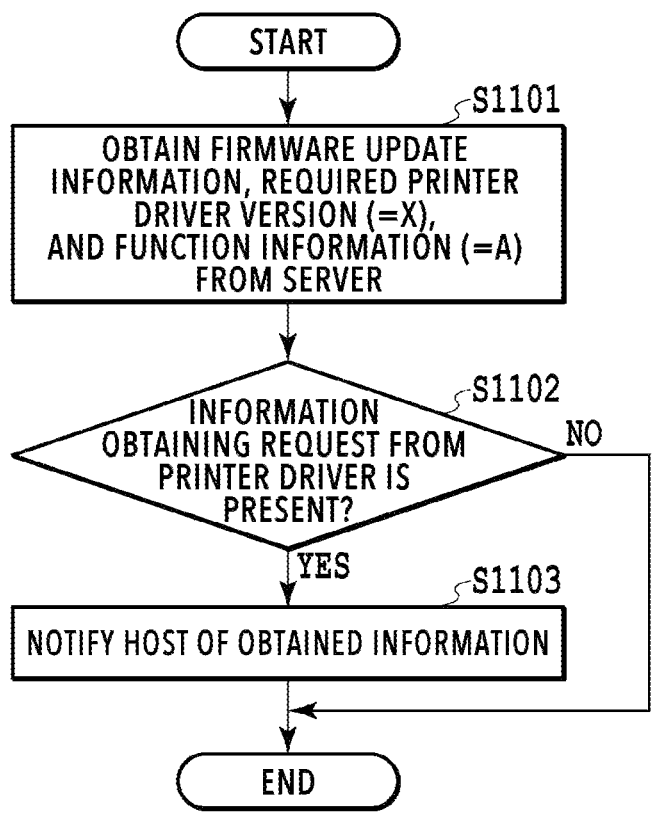
FIG. 11 is a flowchart illustrating information processing of the printer in a third embodiment.

FIG. 11 illustrates information processing of the printer in a third embodiment. This information processing is executed at the activation of the printer 2 and at predetermined intervals while the printer 2 active. In step S1101, the printer 2 obtains the firmware update information, the required printer driver version (=X), and function information (=A) relating to update from the server 4. Specifically, the printer 2 obtains the information retained in the server information retaining unit 208 of the server 4 via the server information transmission unit 209 in response to a request from the printer information obtaining unit 210 of the printer 2. The printer 2 retains the obtained information in the printer information retaining unit 213.

In step S1102, in the case where there is a request for obtaining the information from the driver information obtaining unit 206 of the printer driver 201, the printer 2 proceeds to step S1103 to transmit the information obtained in step S1102 to the printer driver 201, and terminates the processing. Specifically, the printer 2 transmits the information retained in the printer information retaining unit 213 to the driver information obtaining unit 206 via the printer information transmission unit 212.

In the case where there is no request for obtaining the information from the driver information obtaining unit 206 in step S1102, the printer 2 terminates the processing of the present flowchart without performing any operation. Performing this information processing enables transmission of the firmware update information, the required printer driver version (=X), and the function information (=A) to the driver information obtaining unit 206 of the printer driver 201.

Also in the third embodiment, as in the second embodiment, the following two types of processing of the status monitor are both used and performed to surely notify the user of the latest information on the firmware and the printer driver.

Figure 12:
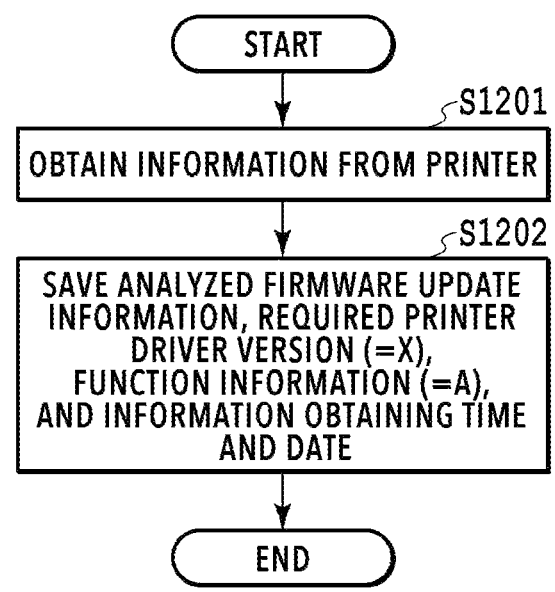
FIG. 12 is a flowchart illustrating first processing of the status monitor in the third embodiment.

FIG. 12 illustrates first processing of the status monitor in the third embodiment. The first processing of the status monitor may be activated in the case where a print operation is performed in the host 1, or may be resident in the host 1 and be regularly activated by polling. In the third embodiment, description is given of the case where the first processing is activated at the time of print operation. Note that, although the status monitor is part of the configuration of the printer driver 201 in the third embodiment, the status monitor may be provided as a separate application installed in the host 1.

In step S1201, the status monitor obtains the firmware update information, the required printer driver version (=X), and the function information (=A) from the printer 2. Next, proceeding to step S1202, the status monitor saves the information obtained in step S1201 and the time and date at which this information is obtained together in the driver information retaining unit 207, and terminates the processing. Performing the first processing of the status monitor allows the host 1 to retain the information obtained from the printer 2 and to perform the display processing of the notification dialogue by using the retained information even if there is a situation where the host 1 cannot obtain the information from the printer 2 occurs after the retaining. Furthermore, the host 1 can obtain and retain the function information (=A) of the printer driver.

Figure 13:
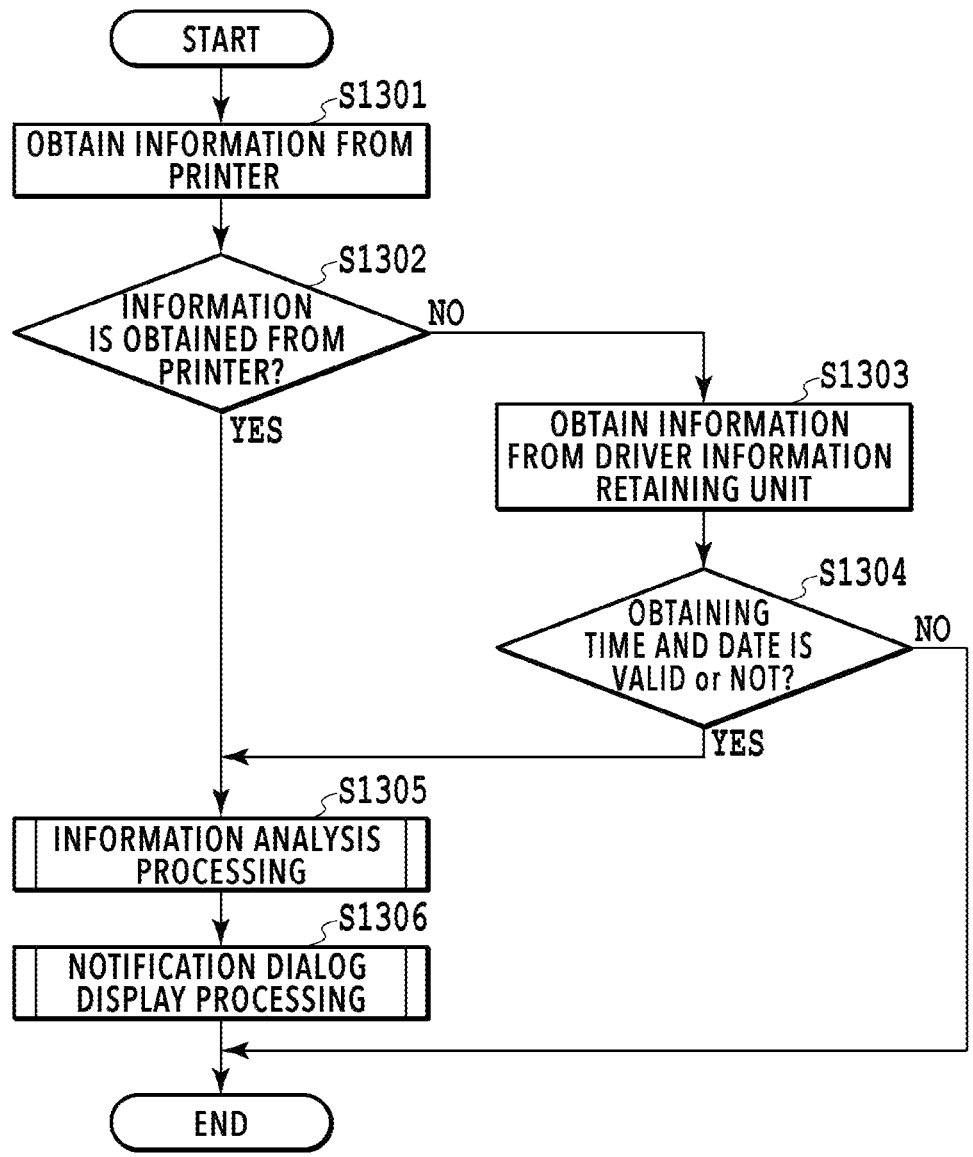
FIG. 13 is a flowchart illustrating second processing of the status monitor in the third embodiment.

FIG. 13 illustrates the second processing of the status monitor in the third embodiment. The second processing of the status monitor is activated in the case where the user performs desired print setting on the printer driver 201 and closes the user interface, that is after the determination of the print setting.

In step S1301, the status monitor obtains the firmware update information, the required printer driver version (=X), and the function information (=A) from the printer 2. Next, proceeding to step S1302, the status monitor checks whether the information has been obtained from the printer 2. In the case where the information has not been obtained, the status monitor proceeds to step S1303. Meanwhile, in the case where the information has been obtained from the printer 2, the status monitor proceeds to processing of step S1305.

In step S1303, the status monitor obtains the information retained in the driver information retaining unit 207 in step S1202 of FIG. 12, that is the information obtained in the first processing of the status monitor. Next, proceeding to step S1304, the status monitor refers to the information on the obtained time and date in the information obtained in step S1303, and determines whether this information is valid or not. In this case, the status monitor compares the obtained time and date with the current time and date. The status monitor determines that the information is valid if a period from the obtained time and date to the current time and date is less than four months, and determines that the information is invalid if the period from the obtained time and date to the current time and date is equal to or more than four months. In the case where the information is valid, the status monitor proceeds to processing of step S1305. In the case where the information is invalid, the status monitor terminates the processing without performing any operation. Although the reference period for determining the validity is set to four months in the third embodiment, the unit or length of the period may be set to any unit or length.

In step S1305, the status monitor performs analysis of the obtained information. Details of step S1305 are described later. Next, proceeding to step S1306, the status monitor performs the notification dialogue display processing, and terminates the processing of the present flowchart. Details of the step S1306 are described later.

In the processing of the status monitor in the third embodiment, since the update notification of the firmware and the printer driver is made to the user after the determination of the print setting, the notification can be made to the user well in advance compared to the case where the notification is made at the time of execution of printing. Moreover, even if there is a situation where the host 1 cannot obtain the information from the printer 2 after the determination of the print setting, the host 1 can surely make the notification to the user by obtaining the information retained in advance. Furthermore, checking the time and date of the retained information can prevent erroneous usage of old information. Moreover, it is possible display a notification dialogue based on the function information (=A) of the printer driver.

Figure 14:
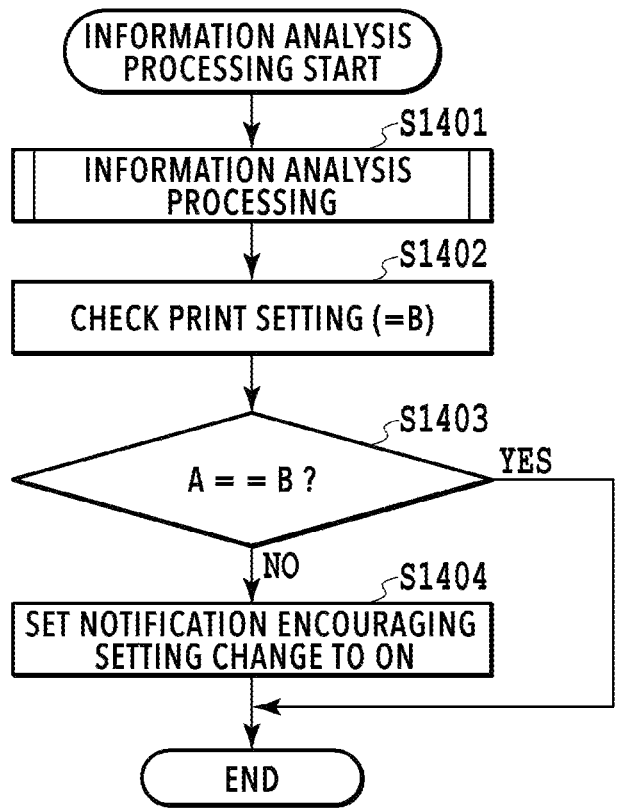
FIG. 14 is a flowchart illustrating processing of the information analysis unit in the third embodiment.

FIG. 14 illustrates processing of the information analysis unit in the third embodiment. This processing is the analysis processing of the information that is executed by the information analysis unit 204 of the printer driver 201 and that is illustrated in step S1305 of FIG. 13. In step S1401, the information analysis unit 204 performs the analysis processing of the information obtained in step S1301 or step S1303. Since the analysis processing of the information in step S1401 is the same as the analysis processing of the information illustrated in FIG. 5, description thereof is omitted herein.

In step S1402, the information analysis unit 204 checks the current print setting (=B). Next, in step S1403, the information analysis unit 204 compares the current print setting (=B) with the function information (=A) that is one of the pieces of information obtained in step S1301 or step S1303.

Print setting that is necessary for the printer driver is expressed herein by using character information, as the function information relating to the update. The function information may also be expressed by using predetermined numerical values. In the case where the function information (=A) and the current print setting (=B) do not match each other (not A=B), the information analysis unit 204 proceeds to step S1404. In step S1404, the information analysis unit 204 sets notification encouraging setting change to ON, and terminates the processing.

Meanwhile, in the case where the function information (=A) and the current print setting (=B) match each other (A=B) in step S1403, the information analysis unit 204 terminates the processing without performing any operation. Performing the processing of the information analysis unit 204 as described above enables analysis of the information obtained from the printer 2, determination of whether the update notification of the printer driver is necessary or not, and determination of whether the update notification of the firmware is necessary or not. Moreover, it is possible to determine whether these update notifications are necessary or not based on the print setting set by the user.

FIG. 15 illustrates processing of the notification dialogue display unit in the third embodiment. This processing is display processing of the notification dialogue that is executed by the notification dialogue display unit 205 of the printer driver 201 and that is illustrated in step S1306 of FIG. 13. In the case where, in step S1501, the notification encouraging the setting change is ON as a result of the analysis processing of the information in step S1305 of FIG. 13, the notification dialogue display unit 205 proceeds to step S1503. Meanwhile, in the case where the notification encouraging the setting change is not ON, the notification dialogue display unit 205 performs display processing of a notification dialogue in step S1502, and terminates the processing. Since the display processing of a notification dialogue in step S1502 is the same as the processing illustrated in FIG. 6, description thereof is omitted herein.

In the case where, in step S1503, the printer driver update notification and the firmware update notification are both ON, the notification dialogue display unit 205 proceeds to processing of step S1504 to display a notification dialogue encouraging the setting change and the printer driver and firmware update, and terminates the processing.

In the case where not both of the printer driver update notification and the firmware update notification are ON, the notification dialogue display unit 205 proceeds to processing of step S1505. In the case where, in step S1505, the printer driver update notification is ON and the firmware update notification is OFF, the notification dialogue display unit 205 proceeds to processing of step S1506 to display a notification dialogue encouraging the setting change and the printer driver update, and terminates the processing.

In the case where the notifications are not in the state where the printer driver update notification is ON and the firmware update notification is OFF, the notification dialogue display unit 205 proceeds to processing of step S1507. In the case where, in step S1507, the printer driver update notification is OFF and the firmware update notification is ON, the notification dialogue display unit 205 proceeds to processing of step S1508 to display a notification dialogue encouraging the setting change and the firmware update, and terminates the processing.

The case where the notification dialogue display unit 205 proceeds to the processing of step S1508 is the case where the version of the printer driver is the latest version, and the firmware of the printer 2 needs to be updated and is the case where the contents of the update and the contents of the print setting match each other. For example, assume a case where printing is executed with the coated paper A selected as the type of paper in the printer driver 201. In this case, since the update of the firmware is not performed, the print data in which the coated paper A is set may not be normally printed in the printer 2. Accordingly, in the processing of the status monitor, it is possible to display the notification dialogue encouraging the setting change and the firmware update and to also stop the printing and force the update of the firmware.

In the case where the notifications are not in the state where the printer driver update notification is OFF and the firmware update notification is ON, specifically, in the case where neither the printer driver nor the firmware needs to be updated, the notification dialogue display unit 205 terminates the processing without performing any operation. Performing the processing of the notification dialogue display unit 205 allows the necessary notification dialogues such as the update notifications of the printer driver and the firmware to be displayed based on the result of the information analysis processing. Moreover, it is possible to encourage setting change based on the print setting set by the user.

FIGS. 16A to 16C illustrate information retained in the print system in the third embodiment. FIG. 16A is information retained by the server information retaining unit 208 of the server 4. The latest firmware version 1.01 is illustrated as the firmware update information. Moreover, as the required printer driver version, FIG. 16A illustrates that the required version of the printer driver necessary for the operation of the latest firmware is 4.60 or above. Furthermore, in the third embodiment, the retained information includes the function information related to the update. As an example, the function information retains addition of the coated paper A as the type of paper, the addition being the update contents in the print system. The function information may include not only the print setting such as the paper size and the scaling rate, but also various functions such as specification of feeding or discharging of the printer 2.

FIG. 16B is information retained by the printer information retaining unit 213 of the printer 2. FIG. 16B illustrates that the firmware is in the state where the update thereof is possible and that the required printer driver version for operating the latest firmware is 4.60 or above. Moreover, the function information retains the addition of the coated paper A as the type of paper, the addition being the update contents in the print system.

FIG. 16C is information retained by the driver information retaining unit 207 of the printer driver 201. This information retains the fact that the firmware is in the state where the update thereof is possible and the fact that the required printer driver version for operating the latest firmware is 4.60 or above. Moreover, the information retains the fact that the update contents in the print system is the addition of the coated paper A as the type of paper, and the time and date at which these pieces of information are obtained.

Figure 17A:
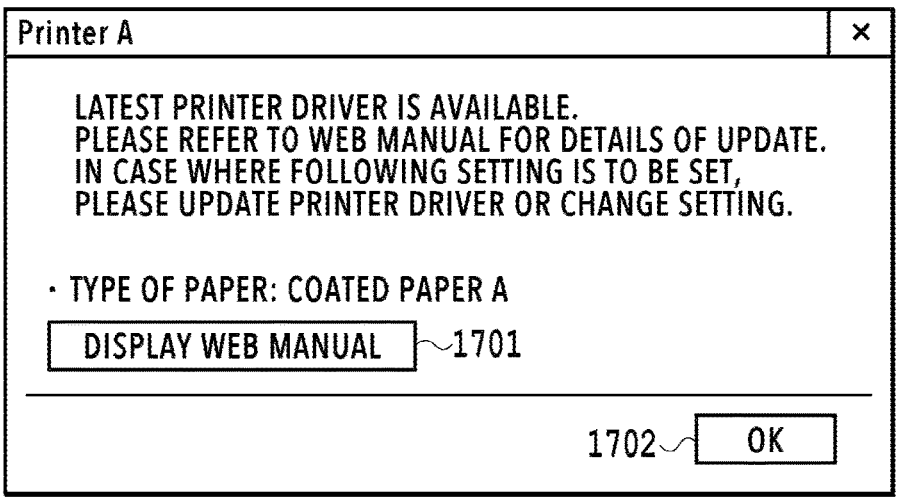
FIGS. 17A to 17C are diagrams illustrating update notification screens displayed by the notification dialogue display unit in the third embodiment.
Figure 17B:
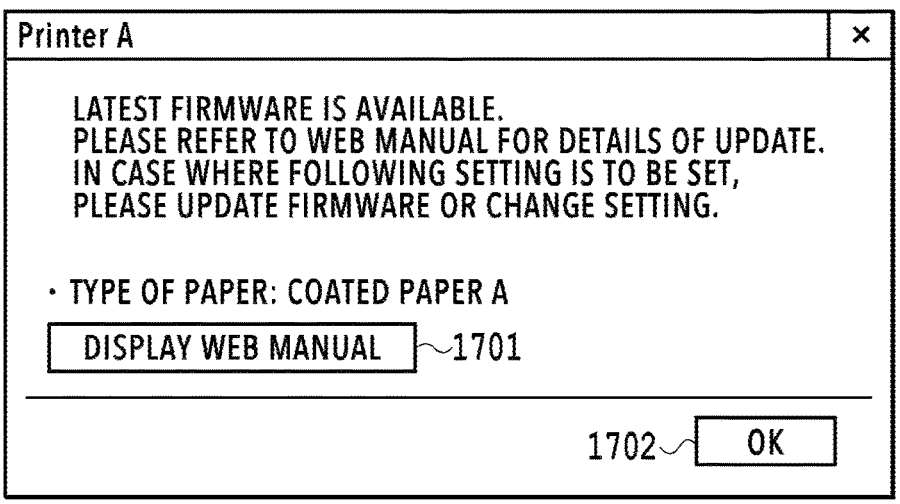
Figure 17C:
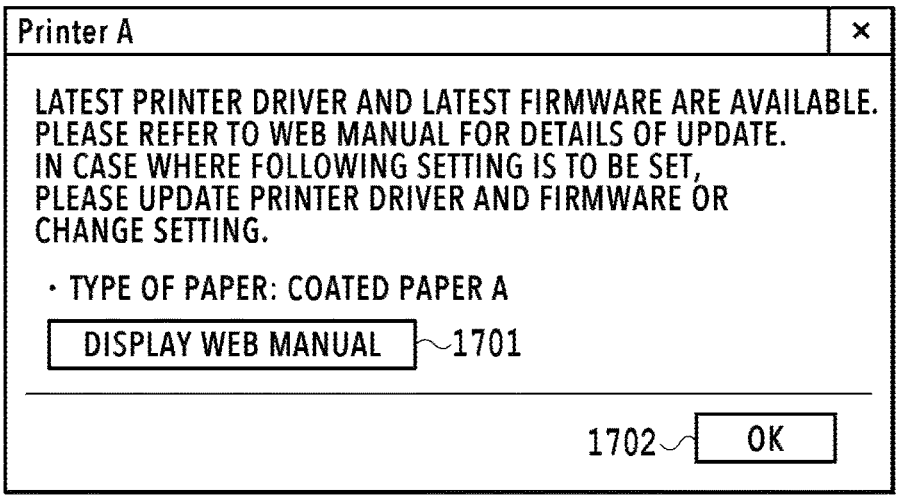

FIGS. 17A to 17C illustrate update notification screens displayed by the notification dialogue display unit in the third embodiment. FIG. 17A is the notification dialogue that encourages the printer driver update and the setting change and that is displayed in the processing of step S1506 illustrated in FIG. 15, and can be displayed on the display 107 of the host 1 by the notification dialogue display unit 205 of the printer driver 201. In this notification dialogue, a message encouraging update to the latest printer driver and a message encouraging change of the print setting are displayed together. Moreover, a manual display button 1701 and an OK button 1702 are displayed in this notification dialogue. In the case where the web manual display button 1701 is pressed, the display jumps to a web page in which a method of updating the printer driver and the firmware and contents of the update are described. In the case where the OK button 1702 is pressed, this notification dialogue is closed.

FIG. 17B is a notification dialogue that encourages the firmware update and the setting change and that is displayed in the processing of step S1508 illustrated in FIG. 15, and a message encouraging update to the latest firmware and a message encouraging change of the print setting are displayed together.

FIG. 17C is a notification dialogue that encourages the printer driver and firmware update and the setting change and that is displayed in the processing of step S1504 illustrated in FIG. 15. In this notification dialogue, a message encouraging update to the latest printer driver and firmware and a message encouraging change of the print setting are displayed together.

Fourth Embodiment

In the fourth embodiment, description is given of examples of other embodiments of the dialogues displayed by the notification dialogue display unit 205 of the printer driver 201 in the display processing of the notification dialogues in the first to third embodiments.

Figure 18A:
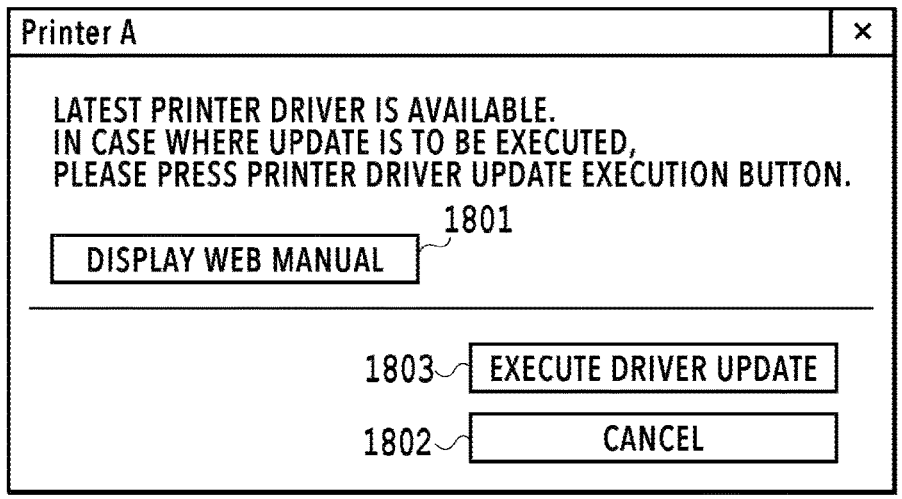
FIGS. 18A to 18C are diagrams illustrating update notification screens displayed by the notification dialogue display unit in a fourth embodiment.
Figure 18B:
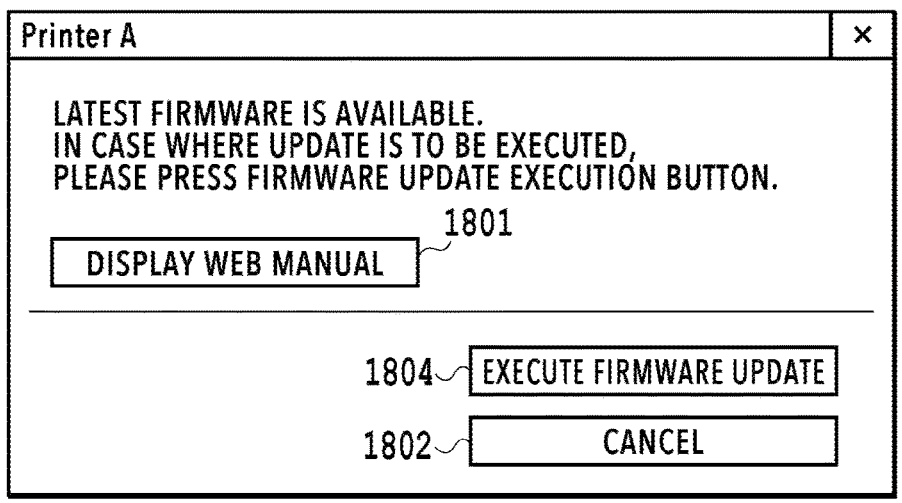
Figure 18C:
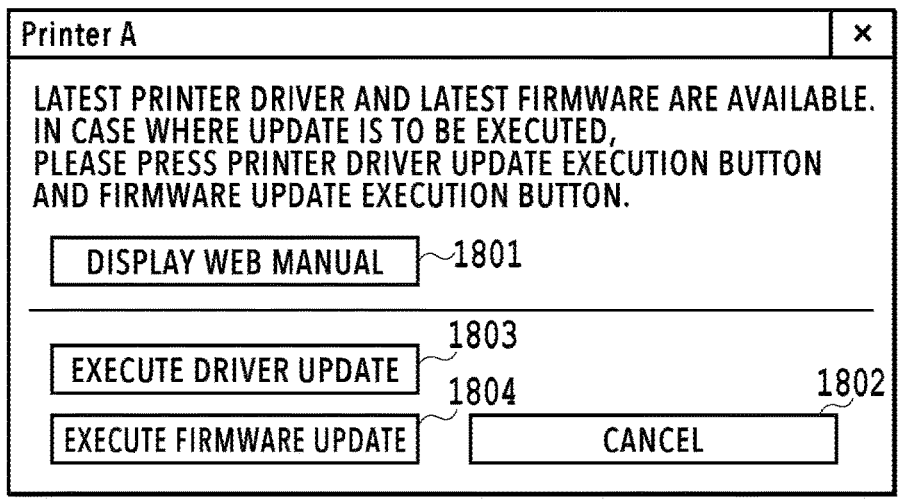

FIGS. 18A to 18C illustrate update notification screens displayed by the notification dialogue display unit in the fourth embodiment. FIG. 18A is a notification dialogue displayed in the processing of step S604 of FIG. 6 and step S1506 of FIG. 15. In the case where a web manual display button 1801 is pressed, the display jumps to a web page in which a method of updating the printer driver and the firmware and contents of the update are described. In the case where a cancel button 1802 is pressed, this notification dialogue is closed. Moreover, the update to the latest printer driver can be executed by pressing a driver update execution button 1803. The printer driver 201 obtains the latest printer driver retained in the server information retaining unit 208 of the server 4 via the server information transmission unit 209, and executes the update in response to pressing of the driver update execution button 1803. Note that the configuration may be such that the printer driver 201 only obtains the latest print driver, and the execution of the update itself is performed by the user. According to the notification dialogue of the fourth embodiment, the update of the printer driver 201 can be performed from the host 1.

FIG. 18B is a notification dialogue displayed in the processing of step S606 of FIG. 6 and step S1508 of FIG. 15. The update to the latest firmware can be executed by pressing a firmware update button 1804. The printer driver 201 obtains the latest firmware retained by the server information retaining unit 208 via the server information transmission unit 209, and executes the update in response to pressing of the firmware update button 1804. Note that the configuration may be such that the printer driver 201 only obtains the latest firmware, and the execution of the update itself is performed by the user. Moreover, the configuration may be such that the printer driver 201 instructs the printer 2 to execute the update of the firmware in response to pressing of the firmware update button 1804, and the update of the firmware is executed in the printer 2. According to the notification dialogue of the fourth embodiment, it is possible to execute the update of the firmware of the printer 2 or instruct the printer 2 to update the firmware from the host 1.

FIG. 18C is a dialogue displayed in the processing of step S602 of FIG. 6 and step S1504 of FIG. 15. Since the function of the driver update execution button 1803 is the same as the function described in FIG. 18A, description thereof is omitted herein. Since the function of the firmware update button 1804 is the same as the function described in FIG. 18B, description thereof is also omitted herein. According to the notification dialogues of the fourth embodiment, it is possible to perform the update of the printer driver 201 and the update of the firmware of the printer 2 simultaneously from the host 1. Moreover, it is possible to update the printer driver 201 and also instruct the printer 2 to update the firmware.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

According to the present invention, it is possible to give the update notification of the firmware of the image printing apparatus and the update notification of the printer driver necessary for the information processing apparatus.

This application claims the benefit of Japanese Patent Application No. 2022-077191, filed May 9, 2022 which is hereby incorporated by reference wherein in its entirety.

What is claimed is:

1. A non-transitory computer readable storage medium storing a program for causing a computer to perform functions as an information processing apparatus having a driver that causes an image printing apparatus to execute image printing, the functions comprising:

a driver information obtaining step for obtaining information on firmware update of the image printing apparatus and information on a required version of the driver;

an information analysis step for comparing a current version of the driver and the information on the required version obtained by the driver information obtaining step; and a display controlling step for displaying an update notification screen based on a result analyzed by the information analysis step and the information on the firmware update obtained by the driver information obtaining step.

2. The storage medium according to claim 1, wherein the driver information obtaining step obtains the information on the firmware update and the information on the required version of the driver from the image printing apparatus.

3. The storage medium according to claim 2, wherein the driver information obtaining step obtains the information on the firmware update and the information on the required version of the driver from a server, and the information processing apparatus includes an information retaining unit for retaining the information on the firmware update and the information on the required version of the driver obtained from the server.

4. The storage medium according to claim 3, wherein, in the case where the driver information obtaining step does not obtain the information on the firmware update and the information on the required version of the driver from the image printing apparatus, the information analysis step uses the information on the firmware update and the information on the required version of the driver retained in the information retaining unit.

5. The storage medium according to claim 4, wherein the driver information obtaining step retains time and date at which the information on the firmware update and the information on the required version of the driver in the information retaining unit.

6. The storage medium according to claim 5, the functions further comprising:

a determination step for determining whether a predetermined period has elapsed from the time and date of obtaining the information to current time and date, wherein the information analysis step analyzes in the case where it is determined that the predetermined period has not elapsed.

7. The storage medium according to claim 1, wherein the driver information obtaining step obtains function information relating to update, and the information analysis step compares the function information obtained by the driver information obtaining step and current function information.

8. The storage medium according to claim 1, wherein the display controlling step displays the update notification screen that receives a user input of executing update of the driver.

9. The storage medium according to claim 1, wherein, in the case where the current version of the driver is newer than the version in the information on the required version of the driver and the information on the firmware update indicates presence of the firmware update, the driver stops execution of the image printing with displaying the update notification screen by the display controlling step.

10. An information processing method executed in an information processing apparatus having a driver that causes an image printing apparatus to execute image printing, the information processing method comprising:

a driver information obtaining step for obtaining information on firmware update of the image printing apparatus and information on a required version of the driver;

an information analysis step for comparing a current version of the driver and the information on the required version obtained by the driver information obtaining step; and a display controlling step for displaying an update notification screen based on a result analyzed by the information analysis step and the information on the firmware update obtained by the driver information obtaining step.

11. An information processing apparatus having a driver that causes an image printing apparatus to execute image printing, the information processing apparatus comprising:

a driver information obtaining unit configured to obtain information on firmware update of the image printing apparatus and information on a required version of the driver;

an information analysis unit configured to compare a current version of the driver and the information on the required version obtained by the driver information obtaining unit; and a display controlling unit configured to display an update notification screen based on a result analyzed by the information analysis unit and the information on the firmware update obtained by the driver information obtaining unit.

* * * * *